United States Patent
Wang et al.

(10) Patent No.: US 7,283,571 B2
(45) Date of Patent: Oct. 16, 2007

(54) METHOD AND SYSTEM FOR PERFORMING WAVELENGTH LOCKING OF AN OPTICAL TRANSMISSION SOURCE

(76) Inventors: Jian Wang, 5923 Derick Dr., Orefield, PA (US) 18069; Yong Kewan Park, 17 Hook Mountain Dr., Annandale, NJ (US) 08801

( * ) Notice: Subject to any disclaimer, the term of this patent is extended or adjusted under 35 U.S.C. 154(b) by 28 days.

(21) Appl. No.: 10/463,458

(22) Filed: Jun. 17, 2003

(65) Prior Publication Data
US 2004/0047638 A1 Mar. 11, 2004

Related U.S. Application Data

(60) Provisional application No. 60/389,219, filed on Jun. 17, 2002.

(51) Int. Cl.
*H01S 3/13* (2006.01)

(52) U.S. Cl. .................................. 372/29.02; 372/32

(58) Field of Classification Search ............ 372/9, 372/29.02, 32
See application file for complete search history.

(56) References Cited

U.S. PATENT DOCUMENTS

| | | | |
|---|---|---|---|
| 4,615,034 A | 9/1986 | Von Gunten et al. | |
| 4,638,669 A | 1/1987 | Chou | |
| 4,650,289 A | 3/1987 | Kuwahara | |
| 4,732,444 A | 3/1988 | Papuchon et al. | |
| 4,763,972 A | 8/1988 | Papuchon et al. | |
| 4,778,234 A | 10/1988 | Papuchon et al. | |
| 4,915,476 A * | 4/1990 | Hall et al. ................. | 359/577 |
| 4,998,793 A | 3/1991 | Henry et al. | |
| 5,077,816 A | 12/1991 | Glomb et al. | |
| 5,088,105 A | 2/1992 | Scifres et al. | |
| 5,091,981 A | 2/1992 | Cunningham | |
| 5,283,845 A | 2/1994 | Ip | |
| 5,299,212 A | 3/1994 | Koch et al. | |
| 5,461,246 A | 10/1995 | Chou | |
| 5,467,415 A | 11/1995 | Presby | |
| RE35,337 E | 9/1996 | Patel et al. | |
| 5,617,234 A | 4/1997 | Koga et al. | |
| 5,654,818 A | 8/1997 | Yao | |
| 5,691,989 A | 11/1997 | Rakuljic et al. | |
| 5,706,301 A | 1/1998 | Lagerstrom | |
| 5,719,976 A | 2/1998 | Henry et al. | |
| 5,726,805 A | 3/1998 | Kaushik et al. | |
| 5,772,905 A | 6/1998 | Chou | |
| 5,777,793 A | 7/1998 | Little et al. | |
| 5,793,784 A | 8/1998 | Wagshul et al. | |

(Continued)

OTHER PUBLICATIONS

Austin, M., et al., "Fabrication for nanocontacts for molecular devices using nanoimprint lithography," J. Vac. Sci. Technol. B 20(2), Mar./Apr. 2002, pp. 665-667.

(Continued)

*Primary Examiner*—Armando Rodriguez
(74) *Attorney, Agent, or Firm*—Reed Smith, LLP

(57) ABSTRACT

A system for locking the operating wavelength of an optical transmission source, the system including: a pattern of nanostructures being optically coupled to the optical transmission source and adapted to perform notch filtering; at least one photodetector optically coupled to the pattern of nanostructures; and, at least one controller operatively coupled to the photodetector and optical transmission source to operate the optical transmission source responsively to the at least one photodetector.

31 Claims, 5 Drawing Sheets

U.S. PATENT DOCUMENTS

| | | | |
|---|---|---|---|
| 5,820,769 A | 10/1998 | Chou | |
| 5,848,080 A | 12/1998 | Dahm | |
| 5,852,688 A | 12/1998 | Brinkman et al. | |
| 5,870,421 A | 2/1999 | Dahm | |
| 5,956,216 A | 9/1999 | Chou | |
| 5,966,483 A | 10/1999 | Chowdhury | |
| 5,973,316 A | 10/1999 | Ebbesen et al. | |
| 5,973,784 A | 10/1999 | Szwaykowski et al. | |
| 6,035,089 A | 3/2000 | Grann et al. | |
| 6,037,644 A | 3/2000 | Daghighian et al. | |
| 6,040,936 A | 3/2000 | Kim et al. | |
| 6,052,238 A | 4/2000 | Ebbesen et al. | |
| 6,064,506 A | 5/2000 | Koors | |
| 6,069,380 A | 5/2000 | Chou et al. | |
| 6,075,915 A | 6/2000 | Koops et al. | |
| 6,093,246 A * | 7/2000 | Lin et al. | |
| 6,101,300 A | 8/2000 | Fan et al. | |
| 6,122,103 A | 9/2000 | Perkins et al. | |
| 6,122,301 A | 9/2000 | Tei et al. | |
| 6,125,220 A | 9/2000 | Copner et al. | |
| 6,130,969 A | 10/2000 | Villeneuve et al. | |
| 6,137,939 A | 10/2000 | Lesesky et al. | |
| 6,154,318 A | 11/2000 | Austin et al. | |
| 6,154,479 A | 11/2000 | Yoshikawa et al. | |
| 6,169,825 B1 | 1/2001 | Morey et al. | |
| 6,175,667 B1 | 1/2001 | Wang et al. | |
| 6,185,233 B1 * | 2/2001 | Moothart et al. | 372/32 |
| 6,191,890 B1 | 2/2001 | Baets et al. | |
| 6,198,557 B1 | 3/2001 | Dultz et al. | |
| 6,198,860 B1 | 3/2001 | Johnson et al. | |
| 6,208,463 B1 | 3/2001 | Hansen et al. | |
| 6,215,928 B1 | 4/2001 | Friesem et al. | |
| 6,233,375 B1 | 5/2001 | Lang et al. | |
| 6,233,380 B1 | 5/2001 | Ferrieu | |
| 6,235,141 B1 | 5/2001 | Feldman et al. | |
| 6,240,109 B1 | 5/2001 | Shieh | |
| 6,251,297 B1 | 6/2001 | Komuro et al. | |
| 6,252,709 B1 | 6/2001 | Sato | |
| 6,253,009 B1 | 6/2001 | Lestra et al. | |
| 6,260,388 B1 | 7/2001 | Borrelli et al. | |
| 6,262,002 B1 | 7/2001 | Carey | |
| 6,263,002 B1 | 7/2001 | Hsu et al. | |
| 6,275,291 B1 | 8/2001 | Abraham et al. | |
| 6,282,340 B1 * | 8/2001 | Nasu et al. | 385/37 |
| 6,285,810 B1 | 9/2001 | Fincato et al. | |
| 6,288,840 B1 | 9/2001 | Perkins et al. | |
| 6,309,580 B1 | 10/2001 | Chou | |
| 6,317,554 B1 | 11/2001 | Kosaka et al. | |
| 6,324,192 B1 | 11/2001 | Tayebati | |
| 6,339,603 B1 | 1/2002 | Flanders et al. | |
| 6,349,103 B1 | 2/2002 | Chung et al. | |
| 6,353,623 B1 | 3/2002 | Munks et al. | |
| 6,359,915 B1 | 3/2002 | Koch et al. | |
| 6,370,177 B1 | 4/2002 | Genei et al. | |
| 6,371,662 B1 | 4/2002 | Leard et al. | |
| 6,374,016 B2 | 4/2002 | Albert et al. | |
| 6,400,860 B1 | 6/2002 | Chandrasekhar et al. | |
| 6,410,416 B1 | 6/2002 | Dodabalapur et al. | |
| 6,482,742 B1 | 11/2002 | Chou | |
| 6,483,640 B1 * | 11/2002 | Tonucci et al. | 359/361 |
| 6,518,189 B1 | 2/2003 | Chou | |
| 6,618,104 B1 | 9/2003 | Date et al. | |
| 6,639,923 B2 * | 10/2003 | Sato et al. | 372/29.02 |
| 6,643,025 B2 * | 11/2003 | Degertekin et al. | 356/505 |
| 6,661,952 B2 | 12/2003 | Simpson et al. | |
| 6,692,797 B1 | 2/2004 | Owen et al. | |
| 6,713,238 B1 | 3/2004 | Chou et al. | |

OTHER PUBLICATIONS

Austin, M., et al., "Fabrication of 70 nm channel length polymer organic thin-film transistors using nanoimprint lithography," Appl. Phys. Lett. 81 (23), Dec. 2, 2002, pp. 4431-4433.

Bird, G.R. et al., "The Wire Grid as a Near-Infrafed Polarizer," J. of the Optical Soc. of America, 50 (9), 886-890, (1960).

Born, Max, and Wolf, Emil: Principles of Optics: Electromagnetic Theory of Propagation, Interference and Diffraction of Light 7th ed. Oct. 1, 1999. Cambridge University Press. p. 790.

Brundrett, D. L.., et al., "Normal-incidence guided-mode resonant grating filters: design and experimental demonstration" Optics Lett., May 1, 1998;23(9):700-702.

Cao, H., et al., "Fabrication of 10 nm enclosed nanofluidic channels," Appl. Phys. Lett. 81 (1), Jul. 1, 2002, pp. 174-176\.

Cao, H., et al., "Gradient Nanostructures for interfacing microfluidics and nanofluidics," Appl. Phys. Lett. 81(16), Oct. 14, 2002, pp. 3058-3060.

Chang, Allan S. P., et al. "A new two-dimensional subwavelength resonant grating filter fabricated by nanoimprint lithography" Department of Electrical Engineering, NanoStructures Laboratory, Princeton University.

Chigrin, D. N.,et al., "Observation of total omnidirectional reflection from a one-dimensional dielectric lattice" Appl. Phy. A. 1999;68:25-28.

Chou, S. Y., et al., "Subwavelength transmission gratings and their applications in VCSELs" Proc. SPIE. 1997;3290:73-81.

Chou, S. Y., et al., "Observation of Electron Velocity Overshoot in Sub-100-nm-channel MOSFET's in Silicon," IEEE Electron Device Letters, vol. EDL-6, No. 12, Dec. 1985, pp. 665-667.

Chou, S.Y., et al., "Imprint Lithography with 25-Nanometer Resolution" Apr. 5, 1996;272(5258):85-87.

Chou, S.Y. , et al., "Sub-10 nm imprint lithography and applications" J. Vac. Sci. Technol. B. Nov./Dec. 1997;15(6):2897-2904.

Chou, S., et al., "Imprint of sub-25 nm vias and trenches in polymers," Appl. Phys., Lett. 67 (21), Nov. 20, 1995, pp. 3114-3116.

Chou, S., et al., "Lateral Resonant Tunneling Transistors Employing Field-Induced Quantum Wells and Barriers," Proceedings of the IEEE, vol. 79, No. 8, Aug. 1991, pp. 1131-1139.

Chou, S., et al., "Nanoscale Tera-Hertz Metal-Semiconductor-Metal Photodetectors," IEEE Journal of Quantum Electronics, vol. 28, No. 10, Oct. 1992, pp. 2358-2368.

Chou, S., et al., "Ultrafast and direct imprint of nanostructures in silicon," Nature, vol. 417, Jun. 20, 2002, pp. 835-837.

Chou, S., G.A., "Patterned Magnetic Nanostructures and Quantized Magnetic Disks," Proceedings of the IEEE, vol. 85, No. 4, Apr. 1997, pp. 652-671.

Cui, B.,et al., "Perpendicular quantized magnetic disks with 45 Gbits on a 4×2 $cm^2$ area," Journal of Applied Physics, vol. 85, No. 8, Apr. 15, 1999, pp. 5534-5536.

Deshpande, P., et al., "Lithographically induced self-assembly of microstructures with a liquid-filled gap between the mask and polymer surface," J. Vac. Sci. Technol. B 19(6), Nov./Dec. 2001, pp. 2741-2744.

Deshpande, P., et al., "Observation of dynamic behavior lithographically induced self-assembly of supromolecular periodic pillar arrays in a homopolymer film," Appl. Phys. Lett. 79 (11), Sep. 10, 2001, pp. 1688-1690.

Fan, S., et al., "Design of three-dimensional photonic crystals at submicron lengthscales" Appl. Phys. Lett. Sep. 12, 1994;65(11)1466-1468.

Feiertag, G. , et al., "Fabrication of photonic crystals by deep x-ray lithography" Appl. Phys. Lett., Sep. 15, 1997;71(11)1441-1443.

Fink, Y., et al, "Guiding optical light in air using an all-dielectric structure" J. Lightwave Techn. Nov. 1999;17(11):2039-2041.

Fink, Y., et al, "A dielectric omnidirectional reflector" Science. Nov. 27, 1998;282:1679-1682.

Fischer, P.B., et al., "10 nm electron beam lithography and sub-50 nm overlay using a modified scanning electron microscope," Appl. Phys. Lett. 62 (23), Jun. 7, 1993, pp. 2989-2991.

Flanders, D.C., "Submicrometer periodicity gratings as artificial anisotropic dielectrics," Appl. Phys. Lett. 42 (6), 492-494 (1983).

Gabathuler, W., et al., "Electro-nanomechanically wavelength-tunable integrated-optical bragg reflectors Part II: Stable device operation" Optics Communications. Jan 1, 1998;145:258-264.

Gaylord, Thomas K., et al., "Analysis and applications of optical diffraction by gratings," Proc. IEEE. May 1985;73(5):894-937.

Goeman, S., et al., "First demonstration of highly reflective and highly polarization selective diffraction gratings (GIRO-Gratings) for long-wavelength VCSEL's" IEEE Photon. Technol. Lett. Sep. 1998;10(9):1205-1207.

Hayakawa, Tomokazu, et al, "ARROW-B Type Polarization Splitter with Asymmetric Y-Branch Fabricated by a Self-Alignment Process," J. Lightwave Techn, 15(7), 1165-1170,(1997).

Hereth, R., et al, "Broad-band optical directional couplers and polarization splitter," J. Lightwave Techn., 7(6), 925-930, (1989).

Ho, K.M., et al., "Existance of a photonic gap in periodic dielectric structures" Dec. 17, 1990;65(25):3152-3155.

Ibanescu, M., et al., "An all-dielectric coaxial waveguide" Science. Jul. 21, 2000;289:415-419.

Joannopoulos, J.D., et al., "Photonic crystals: putting a new twist on light" Nature, Mar. 13, 1997(6621):143-149.

Kokubin, Y. , et al, "ARROW-Type Polarizer Utilizing Form Birefringence in Multilayer First Cladding," IEEE Photon. Techn. Lett., 11(9), 1418-1420, (1993).

Kuksenkov, D. V. , et al., "Polarization related properties of vertical-cavity surface-emitting lasers" IEEE J. of Selected Topics in Quantum Electronics. Apr. 1997;3(2):390-395.

Levi, B.G. , "Visible progress made in three-dimensional photonic 'crystals'" Physics Today. Jan. 1999;52(1):17-19.

Li, M., et al., "Direct three-dimensional patterning using nanoimprint lithography," Appl. Phys. Lett. 78 (21), May 21, 2001, pp. 3322-3324.

Li, M., et al., "Fabrication of circular optical structures with a 20 nm minimum feature using nanoimprint lithography," Appl. Phys. Lett. 76 (6), Feb. 7, 2000, pp. 673-675.

Magel, G.A., "Integrated optic devices using micromachined metal membranes" SPIE. Jan. 1996;2686:54-63.

Magnusson, R., et al., "New principle for optical filters" Appl. Phys. Lett. Aug. 31, 1992;61(9):1022-1023.

Mashev, L., et al., "Zero order anomaly of dielectric coated gratings" Optics Communications. Oct. 15, 1985; 55(6):377-380.

Moharam, M. G., et al., "Rigorous coupled-wave analysis of planar-grating diffraction" J. Opt. Soc. Am. Jul. 1981;71(7):811-818.

Mukaihara, T., et al., "Engineered polarization control of GaAs/AlGaAs surface emitting lasers by anisotropic stress from elliptical etched substrate hole" IEEE Photon. Technol. Lett. Feb. 1993;5(2):133-135.

Noda, S., et al., "New realization method for three-dimensional photonic crystal in optical wavelength region" Jpn. J. Appl. Phys. Jul. 15, 1996;35:L909-L912.

Oh, M., et al., "Polymeric waveguide polarization splitter with a buried birefringent polymer" IEEE Photon. Techn. Lett. Sep. 1999;11(9):1144-1146.

Painter, O. , et al., "Lithographic tuning of a two-dimensional photonic crystal laser array" IEEE Photon. Techn. Lett., Sep. 2000;12(9):1126-1128.

Painter, O., et al., "Room temperature photonic crystal defect lasers at near-infrared wavelengths in InGaAsP" J. Lightwave Techn., Nov. 1999;17(11):2082-2088.

Peng, S., et al., "Experimental demonstration of resonant anomalies in diffraction from two-dimensional gratings" Optics Lett. Apr. 15, 1996;21(8):549-551.

Ripin, D. J., et al., "One-dimensional photonic bandgap microcavities for strong optical confinement in GaAs and GaAs/Al$_x$O$_y$ semiconductor waveguides" J. Lightwave Techn. Nov. 1999;17(11):2152-2160.

Rokhinson, L.P., et al., "Double-dot charge transport in Si single-electron/hole transistors," Appl. Phys. Lett. 76 (12), Mar. 20, 2000, pp. 1591-1593.

Rokhinson, L.P., et al., "Kondo-like zero-bias anomaly in electronic transport through an ultrasmall Si quantum dot," Physical Review B, vol. 60, No. 24, Dec. 15, 1999, pp. 319-321.

Rokhinson, L.P., et al., "Magnetically Induced Reconstruction of the Ground State in a Few-Electron Si Quantum Dot," Physical Review Letters, vol. 87, No. 16, Oct. 15, 2001, pp. 1-3.

Rudin, A., et al., "Charge-ring model for the charge-induced confinement enhancement in stacked quantum-dot transistors," Appl. Phys. Lett. 73 (23), Dec. 7, 1998, pp. 3429-3431.

Russell, P. St. J., et al., "Full photonic bandgaps and spontaneous emission control in 1D multilayer dielectric structures" Opt. Commun. Feb. 1, 1999;160:66-71.

Rytov, S. M., "Electromagnetic properties of a finely stratified medium" Soviet Physics JETP (Journal of Experimental & Theoretical Physics). May 1956;2(1):466-475.

Schablitsky, S., et al., "Controlling polarization of vertical-cavity surface-emitting lasers using amorphous silicon subwavelength transmission gratings," Appl. Phys. Lett. 69 (1), Jul. 1, 1996, pp. 7-9.

Sharon, A. , et al., "Narrow spectral bandwidths with grating waveguide structures" Appl.Phys.Lett. Dec. 30, 1996;69(27):4154-4156.

Sugimoto, Y., et al., "Experimental verification of guided modes in 60 degrees—bent defect waveguides in AlGaAs-based air-bridge-type two-dimensional photonic crystal slabs" J. Appl. Phys. Mar. 1, 2002;91(5):3477-3479.

Sun, X., et al., "Multilayer resist methods for nanoimprint lithography on nonflat surfaces" J. Vac. Sci. Technol. B. Nov./Dec. 1998;16(6):3922-3925.

Tibuleac, S., et al., "Reflection and transmission guided-mode resonance filters" J. Opt. Soc. Am. A. Jul. 1997;14(7):1617-1626.

Trutschel, U. ,et al, "Polarization splitter based on anti-resonant reflecting optical waveguides," J Lightwave Techn., 13(2), 239-243, (1995).

Tyan, R.C., et al., "Design, fabrication and characterization of form-birefringent multilayer polarizing beam splitter" J. Opt. Soc. Am. A. Jul. 1997;14(7):1627-1636.

Tyan, R. et al., "Polarizing beam splitters constructed of form-birefringment multilayer gratings," SPIE 2689, 82-89.

van Blaaderenm, Alfons, "Opals in a New Light" Science. Oct. 30, 1998; 282(5390):887-888.

van Doorn, A. K. Jansen, et al., "Strain-induced birefringence in vertical-cavity semiconductors lasers" IEEE J. Quantum Electronics. Apr. 1998;34(4):700-706.

Vellekoop, A.R. et al, "A small-size polarization splitter based on a planar phase optical phased array," J Lightwave Techn., 8(1), 118-124, (1990).

Wang, J., et al., "Molecular alignment in submicron patterned polymer matrix using nano-imprint lithography," Appl. Phys. Lett. 77 (2), Jul. 10, 2000, pp. 166-168.

Wang, J., et al., "Fabrication of a new broadband waveguide polarizer with a double-layer 190 nm period metal-gratings using nanoimprint lithography" J. Vac. Sci. Technol. B. Nov./Dec. 1999;17(6):2957-2960.

Wang, S. S., et al., "Design of waveguide-grating filters with symmetrical line shapes and low sidebands" Opt. Lett. Jun. 15, 1994;19(12):919-921.

Wang, S. S., et al., "Guided-mode resonances in planar dielectric-layer diffraction gratings" J. Opt. Soc. Am. A. Aug. 1990;7(8):1470-1475.

Weber, M. F., Stover, C.A., Gilbert, L.R. , Nevitt, T.J., Ouderkirk, A.J. "Giant birefringent optics in multilayer polymer mirrors," Science, 287, 2451-2456, Mar. 31, 2000.

Winn, J. N., et al., "Omnidirectional reflection from a one-dimensional photonic crystal" Opt. Lett. Oct. 15, 1998;23(20):1573-1575.

Wu, L., et al., "Dynamic modeling and scaling of nanostructure formation in the lithographically induced self-assembly and self-construction" Appl. Phys. Lett. May 12, 2003;82(19):3200-3202.

Yablonovitch, E., "Inhibited spontaneous emission in solid-state physics and electronics" Phys. Rev. Lett. May 18, 1987;58(20):2059-2062.

Yablonovitch, E., et al., "Photonic band structure: The face-centered-cubic case employing nonspherical atoms" Phys. Rev. Lett. Oct. 21, 1991;67(17):2295-2298.

Yanagawa, H., et al, "High extinction guided-wave optical polarization splitter," IEEE Photon. Techn. Lett., 3(1), 17-18, (1991).

Yoshikawa, T., et al., "Polarization-controlled single-mode VCSEL" IEEE J. Quantum Electronics. Jun. 1998;34(6):1009-1015.

Yu, Z., et al., "Reflective polarizer based on a stacked double-layer subwavelength metal grating structure fabricated using nanoimprint lithography," Appl. Phys. Lett. 77 (7), Aug. 14, 2000, pp. 927-929.

Zakhidov, A.A., et al., "Carbon structures with three-dimensional periodicity at optical wavelengths" Science. Oct. 30, 1998;282(5390):897-901.

* cited by examiner

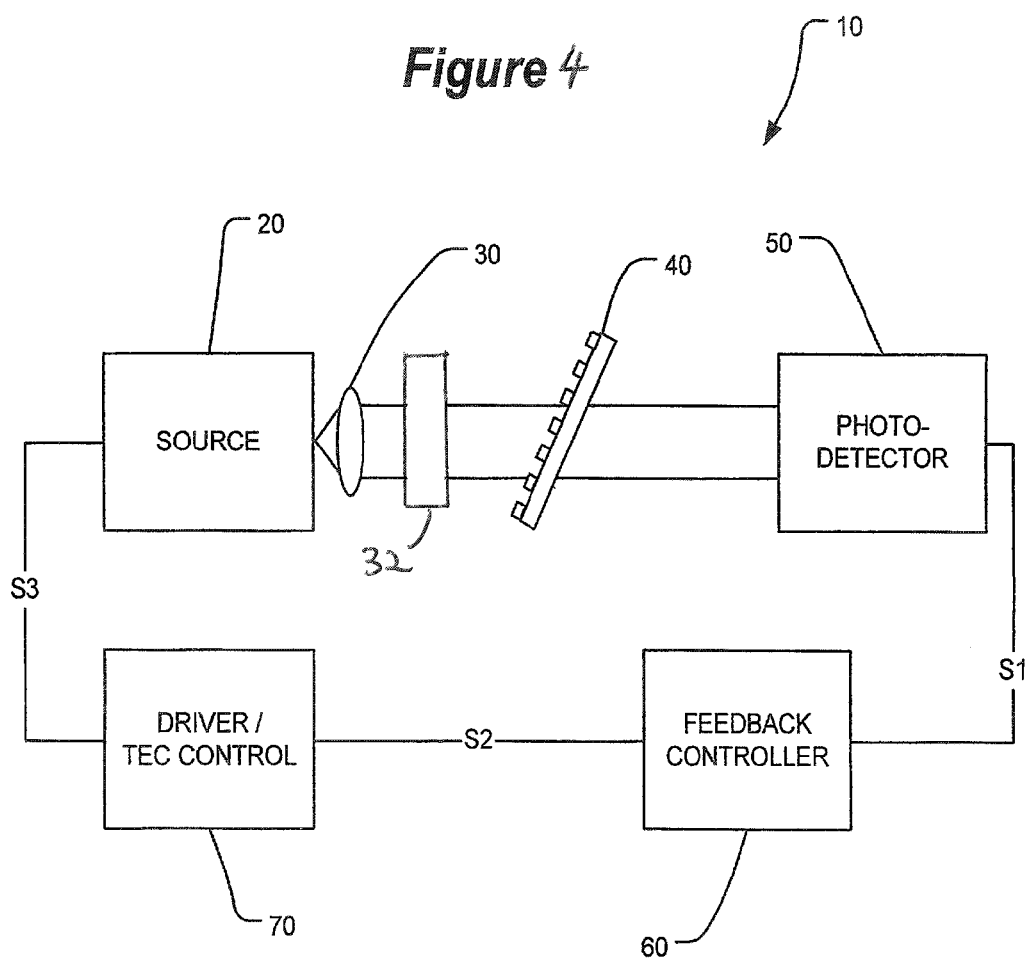

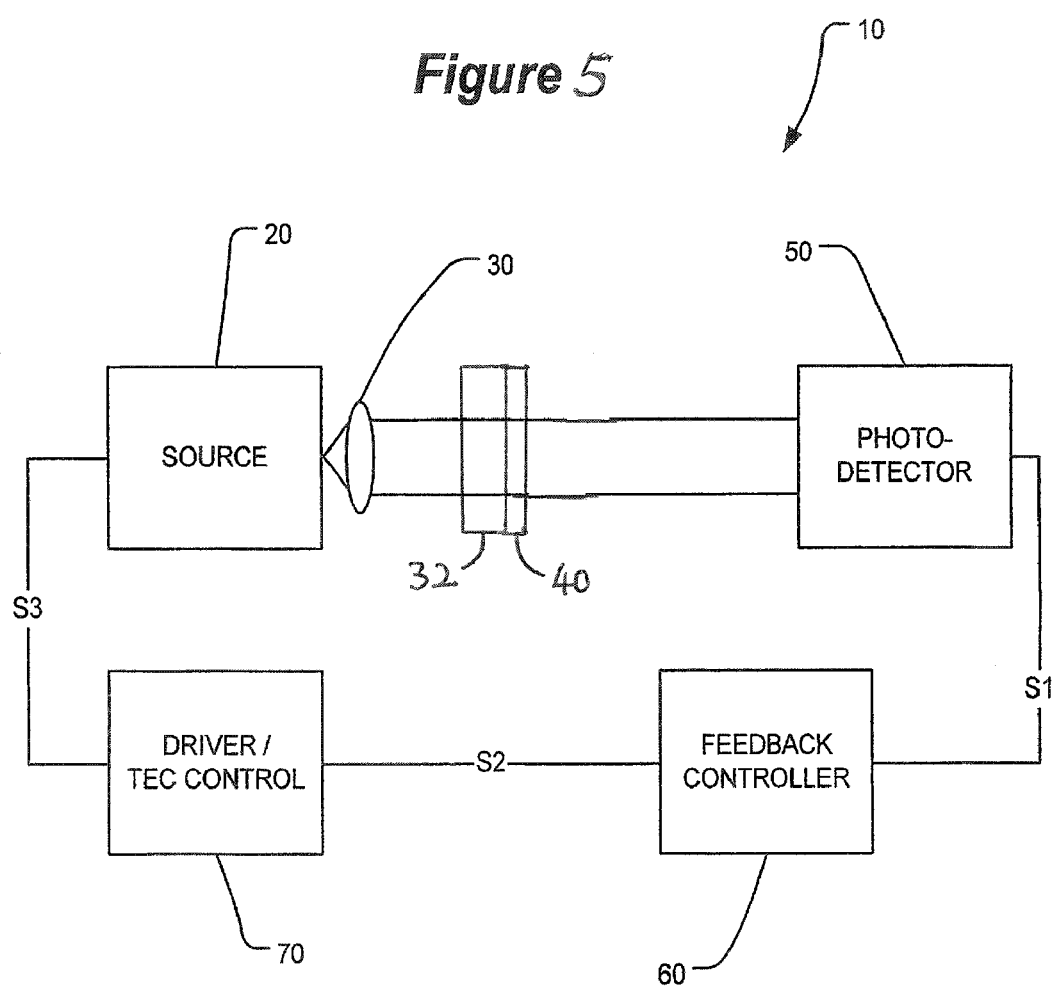

METHOD AND SYSTEM FOR PERFORMING WAVELENGTH LOCKING OF AN OPTICAL TRANSMISSION SOURCE

CROSS REFERENCE TO RELATED APPLICATIONS

This application claims the benefit of U.S. Provisional Application No. 60/389,219, filed Jun. 17, 2002, entitled "METHOD AND SYSTEM FOR PERFORMING WAVELENGTH LOCKING OF AN OPTICAL TRANSMISSION SOURCE", with the named Inventors, Jian Wang, Stephen J. Chou and Yong Kewan Park.

FIELD OF INVENTION

The present invention relates generally to optical devices and systems, and particularly to methods and systems for performing wavelength locking as it relates to optical energy transmitters.

BACKGROUND OF THE INVENTION

Transference of information via propagating light is generally well understood. For example, a conventional optical fiber communications system may include several III-V semiconductor based optical devices interconnected by one or more optical fibers acting as a transmission medium. Information for transmission may be encoded using well understood techniques. This encoded information may typically be used to modulate a driving signal for an optical source or transmitter, such as a semiconductor laser or Light Emitting Diode (LED). The optical source is responsive to a driving signal to generate a transmission that propagates via the transmission medium to a receiver, such as an optical detector. The optical detector may then provide a signal responsively to the detected transmission to a decoder or demodulator. The demodulator, in response to the received signal, provides the information in a suitable form using well understood techniques. Such methods and systems are well understood by those possessing an ordinary skill in the pertinent arts.

In such systems, control of the transmitter may be established. One type of control is conventionally referred to as wavelength control or wavelength locking. For example, in the case of Wavelength Division Multiplexing (WDM) available channel space may be inversely related to channel spacing, the number of desired channels and data rate, for example. That is, as the desired number of channels increases, available channel-width may generally decrease. Thus, wavelength stability, e.g. locking, in optical communications systems is generally important so as to better ensure that adjacent channels do not unintentionally interfere with one-another. Other reasons for controlling and/or monitoring the wavelength of emitted transmissions are also well understood.

This generally results in strict performance guidelines for optical sources or transmitters, such as lasers, Light Emitting Diodes (LEDs) and Super Light Emitting Diodes (SLEDs). However, such transmitters in operation may tend not to consistently output transmissions of a desired wavelength precisely enough, due to a number of factors including operating temperature and bias current fluctuations, for example.

Laser wavelength control systems, and drawbacks associated with them, are generally discussed in U.S. Pat. No. 5,706,301, entitled LASER WAVELENGTH CONTROL SYSTEM, the entire disclosure of which is hereby incorporated by reference herein.

Some approaches that have been suggested for performing wavelength locking include use of etalons, Fiber Bragg Gratings (FBGs) and dielectric thin film filters. Some drawbacks do accompany these solutions however.

For example, a drawback of an etalon lies in temperature sensitivity of the etalon cavity index, as well as the cavity length, which both may determine the phase of output light. Further, to make the fringe narrow in order to gain resolution, the etalon may need to have a high gain or Q, which typically requires two medium/high reflectivity dielectric mirrors. Costs associated with making such an etalon may be high, due to inclusion of a precision cavity length and high quality mirrors, for example. Further, the FSR (free-spectral-range) may present another concern when using etalons for wavelength locking, due to the periodic nature of their performance in the frequency domain as is well understood by those possessing an ordinary skill in the pertinent arts.

While Fiber Bragg Grating (FBG) filters may be less sensitive to temperature, often the cost associated with the FBG is also high. Further, FBGs tend not to be compact devices and also typically need alignment, which further adds to packaging cost.

Dielectric thin film filters are also generally undesirably temperature sensitive and cost prohibitive. For example, to make a narrow filter many stacked layers of dielectric films may be necessary.

Accordingly, it is highly desirable to provide a method and system for providing cost efficient and relatively temperature insensitive wavelength locking for an optical transmitter, such as a laser.

SUMMARY OF THE INVENTION

A system for locking the operating wavelength of an optical transmission source, the system including: a pattern of nanostructures being optically coupled to the optical transmission source and adapted to perform notch filtering; at least one photodetector optically coupled to the pattern of nanostructures; and, at least one controller operatively coupled to the photodetector and optical transmission source to operate the optical transmission source responsively to the at least one photodetector.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which:

FIG. 4 illustrates a system having a splitter and FIG. 5 illustrates a system in which the filter is formed on an interface of the splitter.

DETAILED DESCRIPTION OF THE PREFERRED EMBODIMENTS

Figure 1:
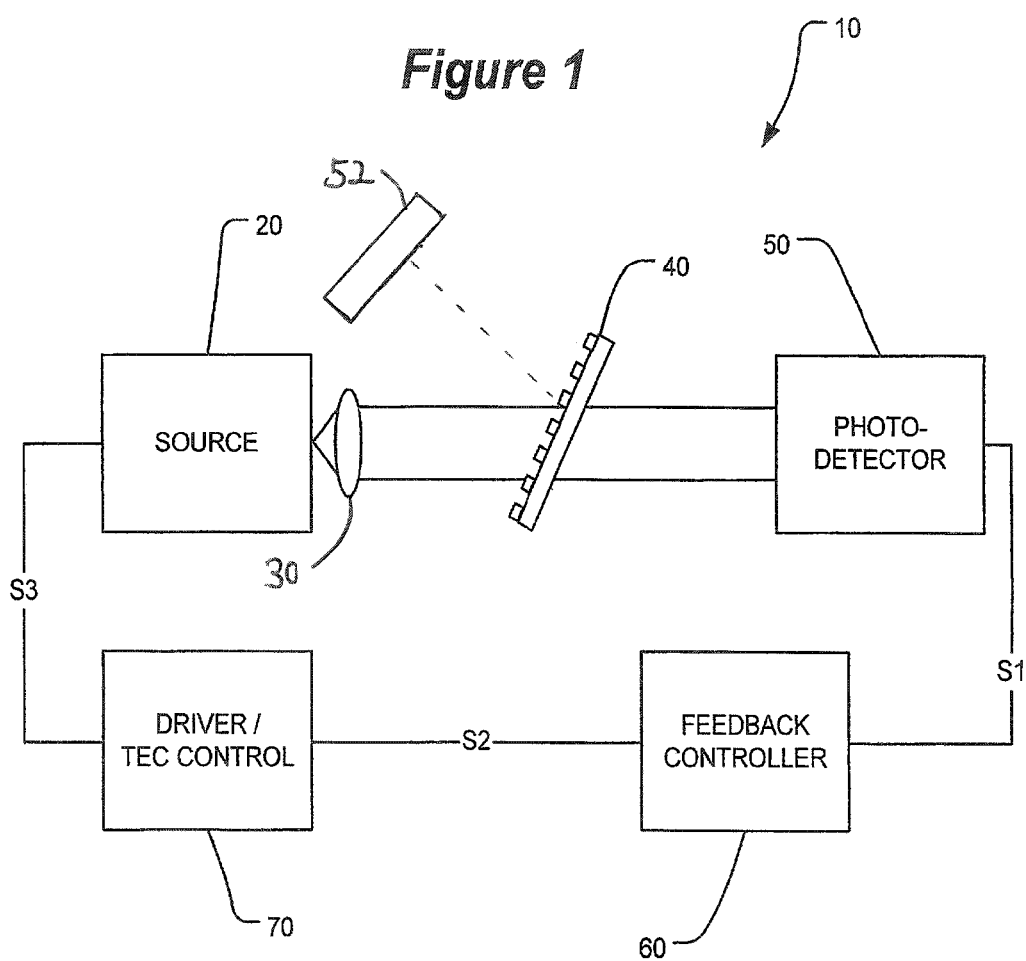
FIG. 1 illustrates a system according to an aspect of the present invention; and, FIG. 2 illustrates transmission characteristics of a filter according to an aspect of the present invention.

It is to be understood that the figures and descriptions of the present invention have been simplified to illustrate elements that are relevant for a clear understanding of the present invention, while eliminating, for purposes of clarity, many other elements found in optical communications systems and optical energy sources. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to such systems and methods known to those skilled in the art.

According to an aspect of the present invention, a pattern of sub-wavelength optical elements, such as nanostructures or nanoelements, for example, with dimensions of 0.1 nm to 1000 nm, may be patterned to provide wavelength locking. In particular, a dimension of 100 nm to 1000 nm may be used. As will be recognized by those possessing ordinary skill in the pertinent arts, various patterns may be fabricated onto the devices. These patterns may serve various optical or photonic functions. Such patterns may take the form of holes, strips, trenches or pillars, for example, all of which may have a common period or not, and may be of various heights and widths. The strips may be of the form of rectangular grooves, for example, or alternatively triangular or semicircular grooves. Similarly pillars, basically the inverse of holes, may be patterned. The pillars may be patterned with a common period in both axes or alternatively by varying the period in one or both axes. The pillars may be shaped in the form of, for example, elevated steps, rounded semi-circles, or triangles. The pillars may also be shaped with one conic in one axis and another conic in the other. Further, the patterns may take the form of variable or chirped structures, such as chirped gratings. Further, a multiple-period pixel structure, super-grating structure or multiple-peak filter or different filter pass band shape may be realized and utilized. Further, the pattern may form a multi-dimensional grating structure which may be polarization independent, for example.

According to an aspect of the present invention, a method and system for locking a wavelength of an optical source, such as a laser, may be achieved. A pattern of nanostructures, such as sub-wavelength resonant grating structures, may be configured so as to perform narrow band notch filtering, which can be used as a wavelength sensitive mechanism to lock and/or monitor the output wavelength of optical transmitters, such as lasers for example. Changing wavelength may be converted into change of optical intensity using the nanostructures, such that by measuring and locking the converted intensity, wavelength locking and monitoring may be effectively realized. Advantages of such a configuration may include being less temperature sensitive, comparable to an Etalon or FBG solution for example; having a relatively simple structure and therefore being relatively easy to fabricate, having a relatively low cost; that it can be integrated into a laser package like an etalon; and that it may exhibit a single filtering peak, rather than a periodic fringe such as that typically associated with an etalon, thereby providing an enhanced FSR of operation.

Referring now to FIG. 1, there is shown a system 10 according to an aspect of the present invention. System 10 may include optical transmission source 20, optics 30, filter 40, optical detector 50, controller 60 and optical transmission source 20 driving circuitry and temperature compensation (TEC) controller 70. A transmission splitter (not shown) may be utilized to provide a transmission for operation as well as a transmission for application to optics 30 from source 20 in a conventional manner. As shown in FIG. 4, a transmission splitter 32 may be optically coupled between the source 20 and the photodetector 50. In one embodiment, the filter 40 may be formed on an interface of the splitter 32.

Optical transmission source 20 may take the form of a distributed feedback (DFB) laser as is conventionally understood, for example. Such a laser operates responsively to conventional driver circuitry that may include temperature compensation functionality as is also well understood in the pertinent arts. Such circuitry may take the form of driving circuitry and controller 70. Of course, source 20 and driver 70 may take any suitable form for telecommunications operation for example, as will be readily understood by those possessing an ordinary skill in the pertinent arts.

Optics 30 serves to distribute output of source 20, i.e. a transmission, across an operable surface area of filter 40, by increasing the spot-size for example. The optically distributed source 20 transmission impinges upon filter 40. Spot-size converters are generally well understood. For example, U.S. Pat. No. 6,253,009, entitled SEMICONDUCTING OPTICAL COMPONENT COMPRISING A SPOT-SIZE CONVERTER, the entire disclosure of which is hereby incorporated by reference herein as if being set forth in its entirety, teaches a spot-size converter that includes a damped coupling section in which the width of the active waveguide tapers down and the width of the passive waveguide increases, and a mode expansion section including only the passive waveguide whose width tapers down. Of course, any suitable method or device for effectively increasing the spot-size may be utilized though.

Filter 40 may include a pattern of nanostructures configured so as to perform narrow band notch filtering around a desired operating frequency of transmission source 20, for example. Changes in the wavelength of source 20 transmissions may be converted by filter 40 into changes in optical intensity using the nanostructure pattern as is readily understood by those possessing an ordinary skill in the pertinent arts. Filter 40 may be provided as a standalone element monolithically integrated into device 10 for example, or may be formed on an output facet of source 20, a surface of optics 30 or an input surface of photodetector 40, for example.

Figure 2:
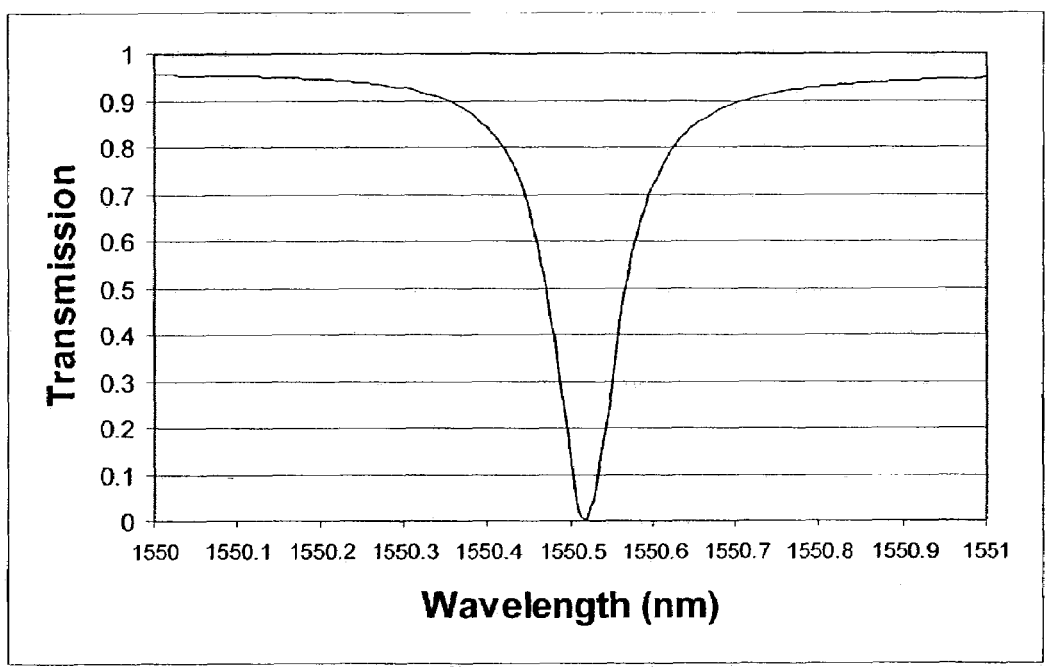
Figure 3:
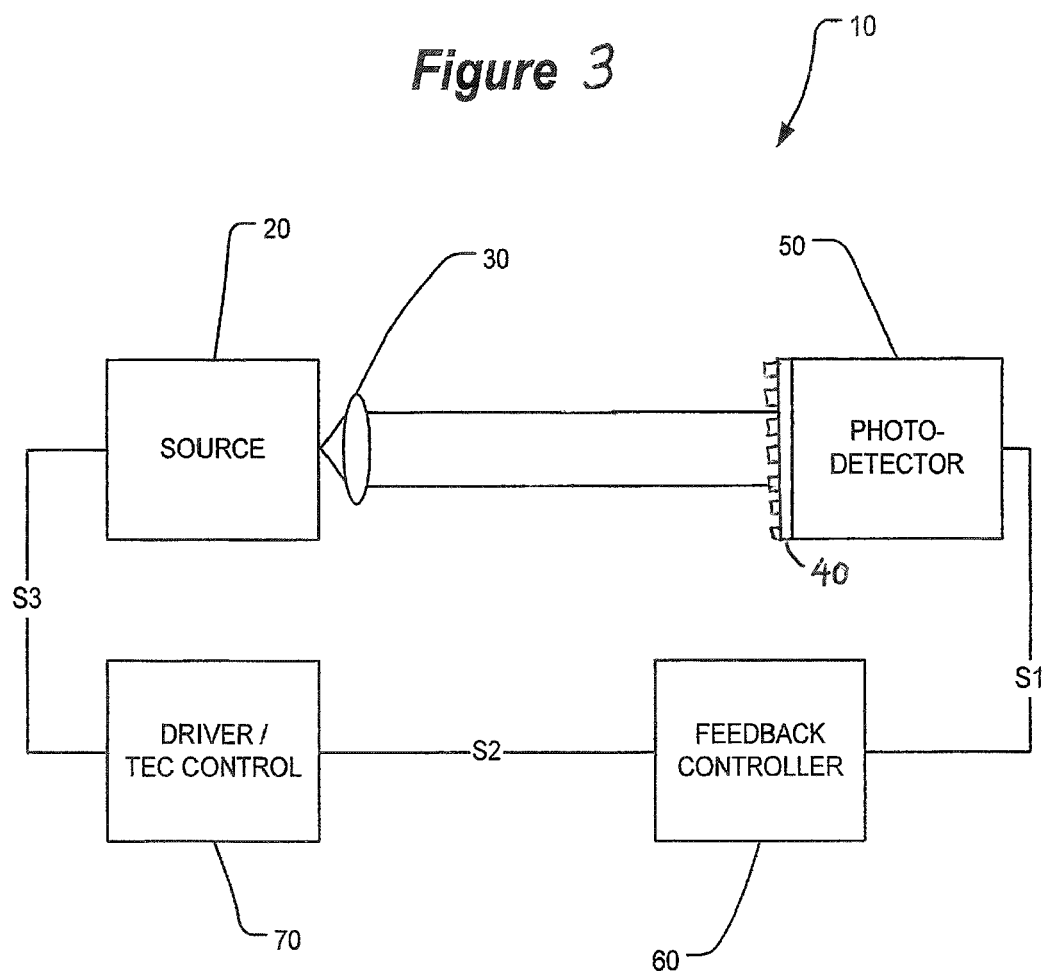
FIG. 3 illustrates a system in which a filter is formed on an interface of a photodetector.

Referring now also to FIG. 2, there is shown a transmission characteristic of a filter suitable for use according to an aspect of the present invention. As is shown therein, filter 40 may exhibit a certain percentage of transitivity at a wavelength suitable for telecommunications, such as 1.55 μm. As the wavelength of the transmission impinging the filter 40 varies, so does the percentage of transitivity. As the transitivity of the filter 40 changes, so does the intensity of the transmission impinging upon detector 50. As will be recognized by those possessing an ordinary skill in the pertinent arts, the transmission characteristics illustrated in FIG. 2 include a single transition in the filtering curve, as opposed to the periodicity typically associated with Etalons for example. This results in an enhanced FSR of operation as compared to Etalon based devices, for example.

Referring still to FIG. 2, according to an aspect of the present invention, a desired locking point may correspond to: a) a maximum intensity (for reflection from filter 40 for example); b) a minimum intensity (for transmission through filter 40 for example); c) a point on the operational transmission characteristic curve (see FIG. 2) on the left or right side of the filtering transition, i.e. where the first derivative of the operational characteristic approaches maximum; or d) any point on the filtering curve.

According to an aspect of the present invention, a single optical detector may use a locking point corresponding to a maximum or minimum intensity to wavelength lock source 20, using dithering technology and methods, for example, such as that taught in U.S. Pat. No. 6,240,109, the entire disclosure of which is hereby incorporated by reference herein.

According to an aspect of the present invention, transmission impinging upon filter 40 may come from either side of the filter 40 with a normal incidence or at an angle ($\alpha$) to the normal. As will be recognized by those possessing an ordinary skill in the pertinent arts, as the angle of incidence ($\alpha$) changes so may the transmission/reflection characteristics of filter 40. For example, multiple minimums and/or maximums may occur. Regardless, according to an aspect of the present invention, either transmission and/or reflection intensity can be used for locking or monitoring, for example. According to an aspect of the present invention, the filter's maximum or minimum transitivity or reflectivity peak wavelength position may occur at normal incidence, as the grating period and the effective index of the waveguide may be precisely controlled, to provide an absolute wavelength standard.

In the case of a locking point on the curve not corresponding to a maximum or minimum of transitivity or reflectivity for example, one photodetector 50 may be used to measure transmissions though the filter 40 for example, while a second photodetector 52 may be used to measure optical transmissions reflected by such a filter for example, thereby providing intensity normalization. Alternatively, a photodetector may be used to measure transmissions for normalization purposes that have not impinged upon filter 40 at all.

Detector 50 may take the form of any photo- or optical-detector being suitable for detecting the changes in intensity generated by filter 40. For example, where the locking point corresponds to a minimum in filter 40 transitivity, a threshold detector may be used. Further, detector 40 may generate a signal S1 responsively to, and being indicative of, the detected intensity in a conventional manner. Signal S1 may be provided to control unit 60. Of course, any suitable method or device for effectively detecting the intensity, and/or changes therein, of transmissions and/or reflections through or from filter 40 may be utilized.

Control unit 60 may take the form of suitable hardware and/or software for receiving signal S1 and generating a control signal S2. For example, controller 60 may take the form of an application specific integrated circuit (ASIC) or microprocessor based computing device, for example. Regardless, control unit 60 receives signal S1, and uses it to determine the wavelength of transmissions emanating from source 20, as signal S1 is indicative of the detected intensity. Based upon the determined wavelength, control unit 60 generates a signal S2. For example, control unit 60 may utilize a lookup table stored in an accessible computing memory and including data indicative of the transmission characteristics of the filter 40. Controller 60 may include circuitry indicative of the same transmission characteristic. Utilizing the lookup table or circuitry, controller 60 may generate a signal 60 indicative of a difference between the desired transmission wavelength and the actual transmission wavelength. Alternatively, signal S2 may be indicative of an amount of tuning necessary to correct the difference, for example.

Signal S2 is provided to driver 70. Driver 70 drives source 20 in a conventional manner. Driver 70 may provide temperature compensation for source 20 in a conventional manner. Temperature compensation may be provided by controller 60. Driver 70, in addition to conventional techniques for example, may utilize signal S2 to drive, or operate, source 20. For example, the operating DC bias current level of a DFB laser serving as source 20 may be adjusted using the driver 70 via signal S3. Signal. S3 may be dependent both upon signal S2 and conventional temperature compensation techniques, for example. Driver 70 may take the form of suitable hardware and/or software for receiving signal S1 and generating a control signal S2. For example, driver 70 may take the form of an application specific integrated circuit (ASIC) or microprocessor based computing device, for example. Controller 60 and driver 70 may be integrated into a single device, such as an ASIC or microprocessor based computing device.

Device 10 may take the form of an integrated electro-optical device. For example, device 10 may be integrally or monolithically formed on a single chip. Controller 60 and driver 70 may be integrated into a single hardware and/or software device.

Referring again to filter 40, a utilized nanostructure may be used to provide the nanostructure pattern and include a lower index ($n_1$) bottom layer 41 (not shown), higher index ($n_2$) layer 42 (not shown), and lower index ($n_3$) top layer 43 (not shown). These layers 41, 42, 43 may form filter 40. Further, a grating (that may be one-dimensional or two-dimensional for example) may be inserted into the waveguiding structure 10.

The nanostructure of filter 40 may be formed in accordance with the teachings of U.S. Pat. No. 5,772,905, issued Jun. 30, 1998, entitled NANOIMPRINT LITHOGRAPHY, the entire disclosure of which is hereby incorporated herein by reference as if being set forth in its entirety. For sake of completeness, the structure may be formed according to the following process.

A mold may be provided. The mold may include a plurality of features having a desired shape. The mold may be patterned with features such as pillars, holes and trenches with a feature size as small as approximately 25 nm for example, using electron beam lithography, reactive ion etching (RIE) and other appropriate methods. The depth of a feature may be from approximately 5 nm to 500 nm, depending upon the desired lateral dimension. In general, the mold can be made of metals, dielectrics, semiconductors or ceramics, or their combination. The mold may include a layer and features of silicon dioxide on a silicon substrate.

A glass substrate including a lower cladding $SiO_2$ layer and SiN core (collectively the substrate) and carrying a thin film layer may also be provided. The thin film layer may be deposited through any appropriate technique such as spin casting. The thin film layer may include a thermoplastic polymer or liquid polymer. Generally, the thin film may be softer than the mold.

A compressive molding step may be accomplished, where the mold is pressed into the thin film layer thereby forming compressed regions corresponding to the mold features. For nanoimprint process, during the compressive molding step, the thin film may be heated to a temperature to allow sufficient softening of the film relative to the mold. For example, above the glass transition temperature the polymer has a low viscosity and can flow, thereby conforming to the features of the mold. The mold may then be removed, resulting in the thin film layer including a plurality of recesses formed at the compressed regions that generally conform to the shape of the mold features. The compressed portions of the thin film may then be removed thereby exposing the underlying substrate. This removal may be through any appropriate process such as oxygen reactive ion etching, for example. The substrate may be further etched by reactive ion etching or wet chemical etching as would be known to those possessing an ordinary skill in the pertinent arts. This forms dams having recesses on the surface of the substrate.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A system for locking the operating wavelength of an optical transmission source, said system comprising:
   a pattern of nanostructures arranged over a substrate in a single plane and in a direction substantially parallel to the substrate, said nanostructures being optically coupled to said optical transmission source and adapted to perform notch filtering, said nanostructures separated by less than the operating wavelength, wherein a transmission characteristic curve of said nanostructures contains a single filtering peak;
   at least one photodetector optically coupled to said pattern of nanostructures; and,
   at least one controller operatively coupled to said photodetector and optical transmission source to operate said optical transmission source responsively to said at least one photodetector.

2. The system of claim 1, wherein said pattern of nanostructures has a transitivity associated with said operating wavelength.

3. The system of claim 2, wherein changes in said operating wavelength have corresponding changes in said transitivity.

4. The system of claim 3, wherein said photodetector detects an intensity of transmissions passing through said pattern of nanostructures.

5. The system of claim 3, wherein said photodetector detects an intensity of transmissions reflected by said pattern of nanostructures.

6. The system of claim 3, further comprising a second photodetector optically coupled to said filter and operatively coupled to said at least one controller and optical transmission source.

7. The system of claim 6, wherein said photodetectors and at least one controller provide intensity normalization for said transmission.

8. The system of claim 1, wherein said at least one controller performs temperature compensation.

9. The system of claim 8, wherein said at least one controller controls a DC current bias of said optical transmission source.

10. The system of claim 1, wherein said optical transmission source, filter, photodetector and controller are contained on a single substrate.

11. The system of claim 1, wherein said notch filtering comprises a transmission characteristic having a single minimum.

12. The system of claim 1, wherein said notch filtering comprises a reflection characteristic having a single maximum.

13. A method for controlling an operating wavelength of an optical energy transmission source, said method comprising:
    emitting optical energy having a given wavelength;
    notch filtering said emitted optical energy using a plurality of nanostructures arranged in a single plane over a substrate and in a direction substantially parallel to the substrate, said nanostructures spaced with a separation less than the operating wavelength, wherein a transmission characteristic curve of said nanostructures contains a single filtering peak;
    detecting an optical energy intensity associated with said given wavelength dependently upon said notch filtering; and,
    controlling continued emission of said optical energy dependently upon said detected optical intensity.

14. The method of claim 13, wherein said detecting an intensity comprises detecting a threshold intensity.

15. The method of claim 13, further comprising determining said given wavelength dependently upon said determined intensity.

16. The method of claim 15, further comprising determining a difference between said operating wavelength and given wavelength.

17. The method of claim 13, wherein said controlling comprises controlling a DC current bias of said optical transmission source.

18. The method of claim 13, further comprising performing compensation for said optical transmission source and said controlling is further dependent upon said temperature compensation.

19. A communication system using a wavelength-stable optical energy transmission generated by a method comprising:
    generating an optical transmission having a given wavelength;
    notch filtering said optical transmission using at least two nanostructures arranged in a single plane over a substrate and in a direction substantially parallel to the substrate, said nanostructures separated by less than the given wavelength, wherein a transmission characteristic curve of said nanostructures contains a single filtering peak;
    detecting an intensity associated with said given wavelength dependently upon said notch filtering; and,
    adjusting said generating dependently upon said detected optical intensity.

20. The communications system of claim 19, wherein said at least one nanostructure has a transitivity associated with said given wavelength.

21. The communications system of claim 20, wherein changes in said given wavelength have corresponding changes in said transitivity.

22. The communications system of claim 19, wherein said adjusting comprises adjusting a DC current bias associated with said generating.

23. The communications system of claim 19, wherein said notch filtering comprises a transmission characteristic having a single minimum or maximum.

24. The communications system of claim 19, further comprising determining said given wavelength dependently upon said determined intensity.

25. The communications system of claim 24, further comprising determining a difference between said operating wavelength and given wavelength.

26. A system for monitoring the operating wavelength of an optical transmission source, said system comprising:
   a pattern of nanostructures arranged in a single plane over a substrate and in a direction substantially parallel to the substrate, said nanostructures separated by less than the operating wavelength, said pattern of nanostructures being optically coupled to said optical transmission source and adapted to perform notch filtering said transmission to generate at least one intensity, wherein a transmission characteristic curve of said nanostructures contains a single filtering peak; and,
   at least one photodetector optically coupled to said pattern of nanostructures and being suitable for generating a signal indicative of said intensity.

27. The system of claim 26, wherein said pattern is formed on an interface of said optical transmission source.

28. A system for monitoring the operating wavelength of an optical transmission source, said system comprising:
   a pattern of nanostructures arranged in a plane over a substrate and in a direction substantially parallel to the substrate, said nanostructures separated by less than the operating wavelength, said pattern of nanostructures being optically coupled to said optical transmission source and adapted to perform notch filtering said transmission to generate at least one intensity, wherein a transmission characteristic curve of said nanostructures contains a single filtering peak; and,
   at least one photodetector optically coupled to said pattern of nanostructures and being suitable for generating a signal indicative of said intensity,
   wherein said pattern is formed on an interface of said at least one photodetector.

29. The system of claim 27, further comprising a transmission splitter optically coupled between said source and said photodetector.

30. A system for monitoring the operating wavelength of an optical transmission source, said system comprising:
   a pattern of nanostructures arranged in a plane over a substrate and in a direction substantially parallel to the substrate, said nanostructures separated by less than the operating wavelength, said pattern of nanostructures being optically coupled to said optical transmission source and adapted to perform notch filtering said transmission to generate at least one intensity, wherein a transmission characteristic curve of said nanostructures contains a single filtering peak; and,
   at least one photodetector optically coupled to said pattern of nanostructures and being suitable for generating a signal indicative of said intensity,
   wherein said pattern is formed on an interface of said splitter.

31. The system of claim 27, wherein said pattern has a transmission characteristic including a single minimum transitivity for said transmission.

* * * * *